(12) United States Patent
Gray et al.

(10) Patent No.: US 9,558,784 B1
(45) Date of Patent: *Jan. 31, 2017

(54) INTELLIGENT VIDEO NAVIGATION TECHNIQUES

(71) Applicant: Amazon Technologies, Inc., Reno, NV (US)

(72) Inventors: Douglas Ryan Gray, Redwood City, CA (US); Adam Carlson, Seattle, WA (US); Ashutosh Vishwas Kulkarni, Bellevule, WA (US); Anna Makris, Seattle, WA (US); Colin Jon Taylor, Orinda, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/667,652

(22) Filed: Mar. 24, 2015

(51) Int. Cl.
*H04N 9/80* (2006.01)
*G11B 27/00* (2006.01)
*H04N 9/87* (2006.01)

(52) U.S. Cl.
CPC .............. *G11B 27/005* (2013.01); *H04N 9/87* (2013.01)

(58) Field of Classification Search
CPC ............ G06K 9/00765; G06K 9/00751; H04N 21/4325; H04N 21/4316; H04N 21/4147; H04N 21/8549; H04N 5/76; H04N 5/147
See application file for complete search history.

(56) References Cited

U.S. PATENT DOCUMENTS

| 2009/0116815 | A1* | 5/2009 | Ryu | H04N 5/76 386/241 |
| 2010/0088726 | A1* | 4/2010 | Curtis | G11B 27/034 725/45 |

* cited by examiner

*Primary Examiner* — Huy T Nguyen
(74) *Attorney, Agent, or Firm* — Hogan Lovells US LLP

(57) ABSTRACT

Automatic replay or skip ahead functionality can be configured to intelligently navigate to a portion of a video a user desires to view. The context at which a user selects intelligent navigation can be analyzed to determine where to initiate automatic replay or skip ahead. The context for intelligent navigation can be based on scene or shot segmentation data, closed captioning, aggregate video navigation data from a community of users of shared demographic traits and/or interest, and/or other metadata. In the case of automatic replay, playback of a portion of a video can include enhancements for that portion, such as providing closed captioning, display at a decreased frame rate ("slow motion"), zooming in/out on a portion of the frames of a video segment, among other enhancements.

20 Claims, 9 Drawing Sheets

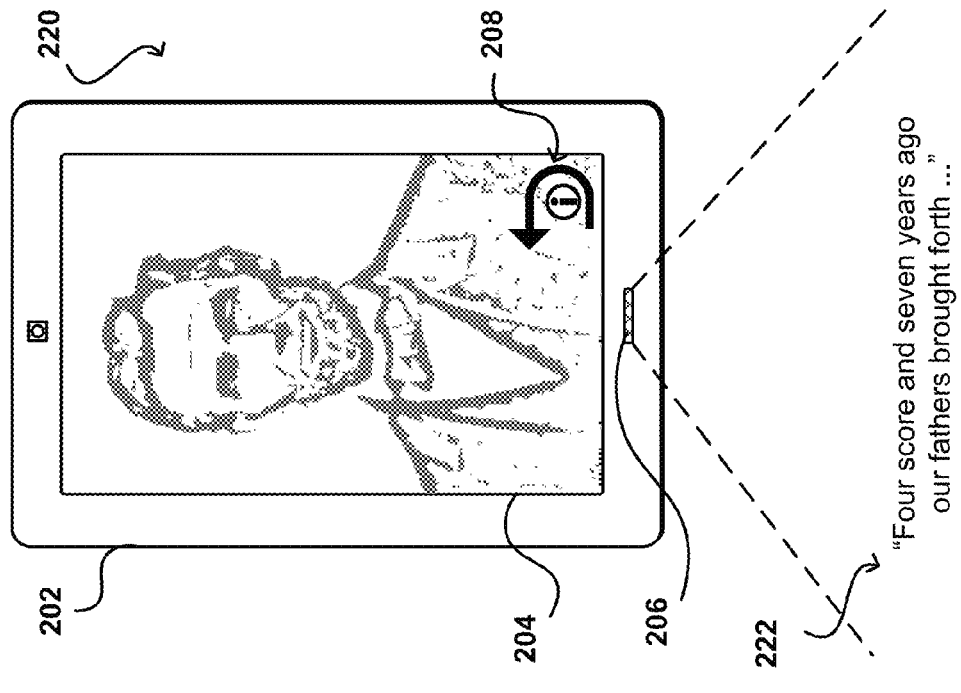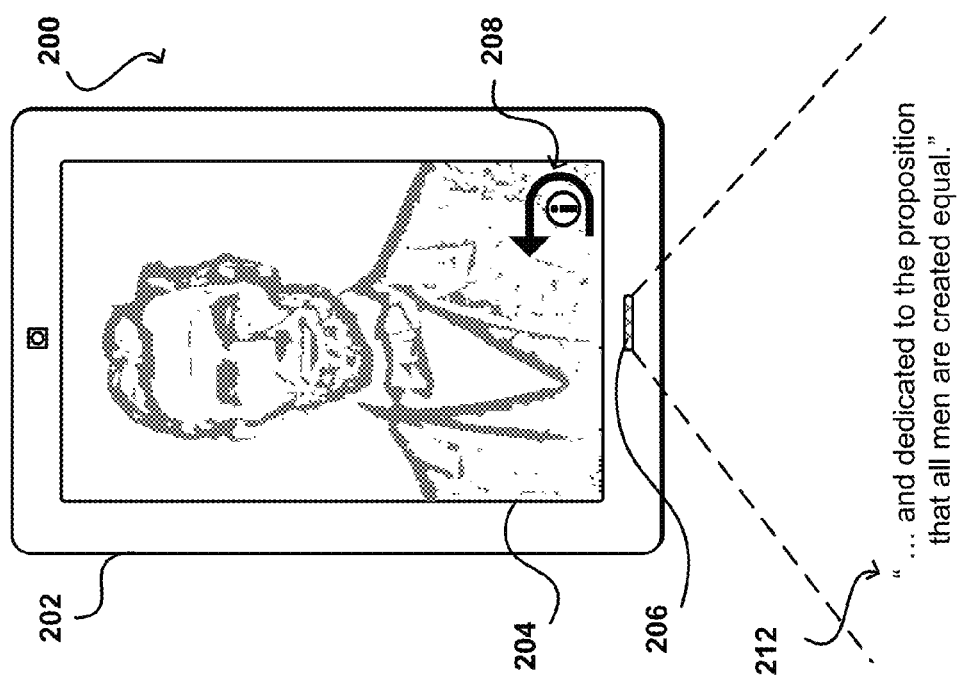

INTELLIGENT VIDEO NAVIGATION TECHNIQUES

BACKGROUND

Applications such as video-on-demand, video-sharing, digital video broadcasting, massive open online courses (MOOCs) or distance education, among other uses of digital video, are becomingly increasingly popular. An advantage of digital video over analog video is the relative ease in which users can navigate digital videos. For example, a conventional approach for navigating a digital video is the use of a "scrubber" that enables a user to quickly "fast-forward" by moving the scrubber forward and to quickly "rewind" by moving the scrubber backward. Another conventional approach for navigating a digital video is to provide a "skip ahead" button that fast-forwards a video by a specified number of seconds and a "playback" or "replay" button that "rewinds" the video by a specified number of seconds. However, these techniques of using a scrubber or skipping forward or reversing backward by a specified number of seconds may not accurately reflect where in the digital video the user has intended to navigate.

BRIEF DESCRIPTION OF THE DRAWINGS

Various embodiments in accordance with the present disclosure will be described with reference to the drawings, in which:

FIGS. 2A and 2B illustrate an example approach for providing intelligent navigation for a digital video that can be used in accordance with an embodiment;

DETAILED DESCRIPTION

Figure 1B:
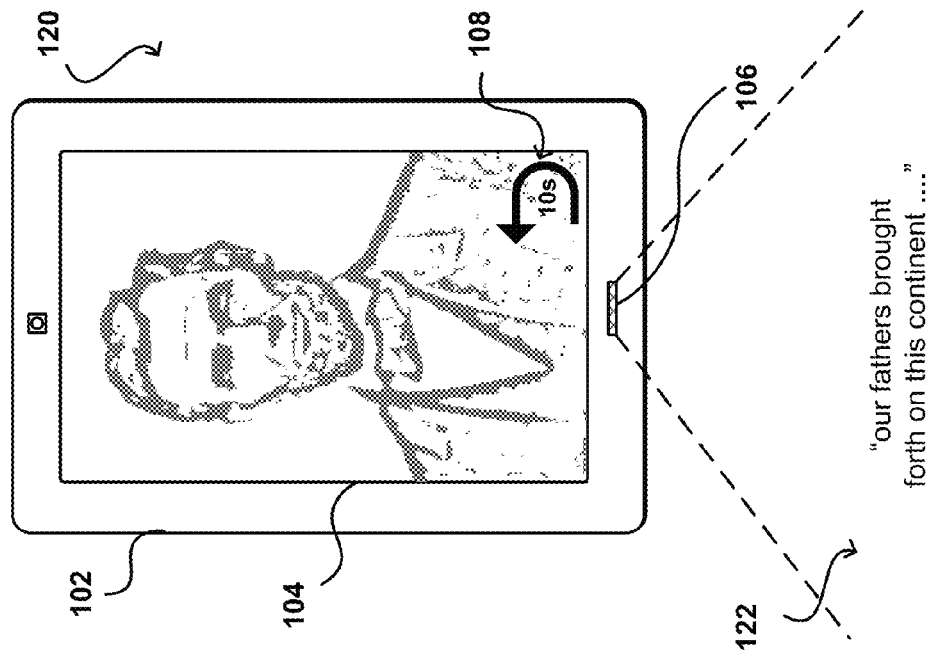
FIGS. 1A and 1B illustrate a conventional approach for providing navigation for a digital video.

Systems and methods in accordance with various embodiments of the present disclosure may overcome one or more of the aforementioned and other deficiencies experienced in conventional approaches for enabling a user to navigate a digital video. In some embodiments, a user can select to replay a portion of a video, and based on the context of the video, the video will automatically be navigated to the portion the user most likely intended to replay. For example, the video may be replayed at the beginning of a shot or a scene depending upon how much of the shot or the scene has already been played. As another example, the video may be replayed at the beginning of dialogue, such as the start of a monologue, narration, conversation between multiple characters, among other possibilities.

In various embodiments, a segment of a video that is replayed can automatically be enhanced to improve video playback. For instance, in certain embodiments where a segment of video to be replayed includes dialogue, closed captioning can be presented during that segment. In some embodiments where a section of video corresponds to an action scene or action shot, the section can be played back in "slow motion" or at a decreased frame rate. In at least some such embodiments, sound and/or dialogue can automatically be adjusted to account for the slow motion or decreased frame rate, such as by increasing the length of time in between gaps in sound and/or dialogue. In some embodiments, extrinsic data, such as cast and character images and information, biographical information, quotations, trivia, goofs, related offerings, scene information, and other extrinsic data may be presented during replay. In some embodiments, a replayed segment can automatically be zoomed in or zoomed out of a particular portion of one or more frames of the replayed segment.

In some embodiments, the context of a section of video that is replayed can be based on scene or shot segmentation metadata. That is, a video may be segmented according to scenes and/or shots, and this data can be used to determine where in the video to begin replay. In other embodiments, replay context may be dependent upon analysis of closed captioning associated with a video, speech-to-text translation of dialogue, or similar text-based approaches. In some embodiments, video replay context may be based on aggregated data of users who have previously viewed the video. For example, a threshold number of previous viewers may have requested playback of a particular segment of the video, such as due to that segment including unintelligible audio or due to that segment being especially compelling to the previous viewers. As another example, a threshold number of previous viewers may have turned up the volume at a particular segment of the video indicating that the segment incorporates inaudible audio. Such data can be collected, and when a current viewer requests to replay that particular segment, playback can be based on the aggregated data. In certain embodiments, some combination of these various approaches, among others, can be utilized to determine where to begin playback of a video.

In some embodiments, a user can select to skip a portion of a video, and the video will automatically be forwarded to a subsequent section of the video using similar techniques discussed above. For example, the user can automatically skip to the end of a scene or a shot or the conclusion of certain dialogue. In other embodiments, scenes or shots may be associated with certain metadata that can be used to automatically advance a video to a later segment. This metadata can include information classifying a shot or a scene as corresponding to opening credits or closing credits, information indicating that the shot or scene includes objectionable material (e.g., nudity, adult language, violence, etc.), information indicating an end point of dialogue, information indicating an end point of a song or score incorporated within the shot or scene, among other possibilities. In still other embodiments, a scene can be automatically advanced based on the collective behavior of viewers who have previously viewed the video. In yet still other embodiments, some combination of these approaches, among others, can be used to determine automatic video fast-forwarding.

Various other functions and advantages are described and suggested below as may be provided in accordance with the various embodiments.

Figure 1A:
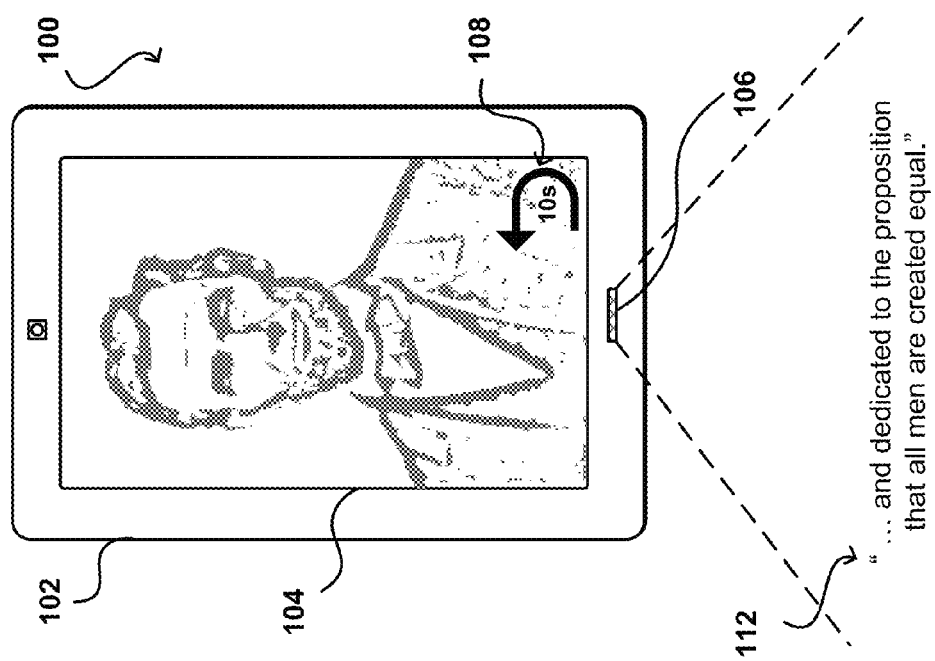

FIGS. 1A and 1B illustrate a conventional approach for enabling a user to navigate a digital video. In the example situation 100 of FIG. 1A, a video of President Abraham Lincoln is shown on display screen 104 of computing device 102. At a certain sequence, President Lincoln is delivering the Gettysburg address, in particular, the words 112, "and dedicated to the proposition that all men are created equal," which is output via speaker 106 of the computing device. The application, operating on computing device 102 and playing the video of President Lincoln presenting the Gettysburg address, includes a conventional user interface element 108 that enables a user to navigate to a portion of the video 10 seconds back in time. User interface element 108 is sometimes referred to as a playback, replay, or skip back button. User interface element 108 is provided, for example, in the event that a user didn't understand or missed a portion of dialogue to enable the user to playback or replay the missed dialogue. As another example, a particular video sequence may be especially compelling to a user and the playback or reply button enables the user to re-watch the sequence.

In the example situation 120 of FIG. 1B, a user (not shown) has clicked on user interface element 108, causing a previous portion of the video 10 seconds back in time to be displayed on display screen 104 of computing device 102. Upon clicking the playback or replay button 108, speaker 106 outputs a portion of the Gettysburg address at the words 122, "our fathers brought forth on this continent." The conventional approach thus plays a previous portion of a video a static amount of time (i.e., 10 seconds) back in time. This static approach may not navigate to the portion of the video the user is actually interested in re-watching but instead, such as here, navigates to the middle of dialogue (i.e., the middle of the first sentence of the Gettysburg address). A user is likely to be more interested in playing back a sequence of the video at the beginning of a scene or shot, or at the beginning of the dialogue, which is oftentimes not a static amount of time back in time.

FIGS. 2A and 2B illustrate an example approach for enabling a user to navigate a digital video that can be used in accordance with an embodiment. In the example situation 200 of FIG. 2A, a video of President Abraham Lincoln is presented on display screen 204 of computing device 202. Although a portable computing device (e.g., a smart phone, tablet computer, or portable digital media player) is shown that can be held in a user's hands, it should be understood that other types of computing devices can utilize aspects of the various embodiments as should be apparent in light of the teachings and suggestions contained herein. These other types of computing devices can include, for example, desktop computers, notebook computers, video gaming consoles, televisions, television set top boxes, digital video disc (DVD) players, digital media players, network appliances, among others. At a particular sequence in time, President Lincoln is delivering the words 212, "and dedicated to the proposition that all men are created equal," of the Gettysburg address. This portion of the Gettysburg address is output to speaker 206 located on the front of the device and the on same surface as the display screen to output audio to subject matter facing the front of the device, such as a user (not shown) viewing the display screen. It should be understood that, while the components of the example device are shown to be on a "front" of the device, there can be similar or alterative components on the "sides" or "back" of the device as well (or instead). Further, directions such as "front," "side," and "back" are used for purposes of explanation and are not intended to require specific orientations unless otherwise stated. In some embodiments, a computing device may include more than one speaker on the front of the device and/or one or more speakers on the back (and/or sides) of the device.

The example situation 200 of FIG. 2A is similar to the example situation 100 of FIG. 1A. However, in the example 200 of FIG. 2A, the application operating on computing device 202 and playing the video of President Lincoln, includes a user interface element 208 that provides for "intelligent" navigation to a previous portion of the video based on the context of the current portion video being played. In this example, an "i" icon is used to indicate that user interface element 208 provides for intelligent playback or replay. In other embodiments, a dynamic amount of time can be displayed to indicate the previous portion of the video that will be played back upon selection of the intelligent replay button. For example, if the context of the current portion of the video indicates that replay should occur 8.9 seconds back in time, "8.9 s" can be displayed in lieu of the "i" icon. Further, it will be appreciated that the intelligent replay button 208 is not necessarily always displayed during the presentation of a video. Instead, in various embodiments, a user interaction during the playing of the video is required to cause the intelligent replay button 208 to be displayed and to be selectable (e.g., pressing a remote control button, moving a virtual cursor over the video, touching or having a finger hovering over a touchscreen displaying the video, etc.)

As mentioned, in some embodiments, the context for automatic video navigation can be based on scene or shot segmentation data. Video segmentation generally involves the partitioning of a video into its constituent parts, such as scenes, shots, and frames. A scene comprises a series of consecutive shots grouped together because, for example, they are captured in the same location or they share thematic content. A shot can be a sequence of frames recorded contiguously and representing a continuous action in time or space. A shot can also be an unbroken sequence of frames captured by a single camera. A frame is a single still image of a video. For example, a 90 minute film shot at 24 frames per second will contain 129,600 frames. Approaches for segmenting a video are discussed in co-pending U.S. patent application Ser. No. 14/577,277, filed Dec. 14, 2015, and entitled "Video Segmentation Techniques," which is hereby incorporated herein by reference. Once a video has been segmented according to scene or shot, the segmentation data can be used for determining how far backward (or forward) to navigate the video when a user selects to replay (or fast-forward) a particular section of the video. For instance, in at least some embodiments, pressing a replay (or skip ahead) button can result in a video being navigated to a beginning (or end) of a scene or a shot.

In other embodiments, the context for automatic video navigation can be based on the dialogue corresponding to a section of video. For example, clicking on a replay (or skip ahead) button by a user can cause a video to be navigated based on closed captioning cues. Closed captioning is typically embedded in a video (e.g., CEA-608, CEA-708, among others) or stored as a separate file (e.g., TTML, DFXP, SMPTE-TT, SCC, EBU-TT, EBU-STL (binary), WebVTT, among others). CEA-608, also sometimes referred to as Line 21, is the National Television System Committee (NTSC) analog television standard used in the United States and Canada. In CEA-608, captions are encoded directly into a hidden area of the video stream by broadcasting devices. CEA-708 is the Advanced Television Systems Committee (ATSC) digital television standard used in the United States and Canada. Timed Text Markup Language (TTML) is a markup language that provides for the synchronization of text and other media, such as audio or video. Distribution Format Exchange Profile (DFXP) is a particular implementation of TTML that defines when and how to display caption data. Society of Motion Picture and Television Engineers-Timed Text (SMPTE-TT) is an extension of DFXP that adds support for three extensions found in other captioning formats and informational items but not found in DFXP, #data, #image, and #information. SMPTE-TT is also the FCC Safe Harbor format. If a content provider produces captions in SMPTE-TT format, the provider has satisfied its obligations to provide captioning in an accessible format. Scenarist Closed Caption (SCC) format contains SMTPE timecodes with corresponding encoded caption data as a representation of CEA-608 data. EBU-TT is a strict subset of TTML, and supported by the European Broadcast Union (EBU). That is, all EBU-TT files are valid TTML documents but not all TTML documents are valid EBU-TT files. EBU-STL is a binary format used by the EBU. EBU-STL files are stored as separate .STL files. Synchronized Accessible Media Interchange (SAMI) is based on HTML. WebVTT is a proposed standard for HTML5 video closed captioning. In at least some embodiments, closed captioning data can be utilized for enabling automatic video navigation. For example, if a user selects to replay (or fast-forward) a first section of video, the closed captioning data may be analyzed to determine a section of the video marking the beginning (or end) of a monologue, narration, or conversation from which automatic navigation can be initiated.

In still other embodiments, aggregate data from a community of users can be utilized for enabling automatic video navigation. In some embodiments, the community of users may share a demographic trait, such as age, gender, geographic location, income bracket, among others, with the specific user. In other embodiments, the community of users may share common interests, such as viewing, purchasing, recommending, and/or rating similar products and/or consuming common media items (e.g., video, music, books, video games, apps, etc.) In still other embodiments, the community of users can be based on a combination of shared demographic traits and interests. Once a community of users has been identified, their interactions with videos can be monitored and utilized for automatic video navigation for a particular user. For example, if a threshold number of users request playback (or skip ahead) from a first section of video to a second earlier (or later) section of video, such data can be a good indication of where to initiate automatic video navigation because it is more likely that the particular user would also prefer to navigate from the first section to the earlier (or later) second section.

In yet still other embodiments, other data associated with a digital video can be utilized for automatic video navigation, such as audio data (e.g., background song, score, or other audio), data regarding actors appearing in a scene, other text data (e.g., subtitles, location text, etc.) or other metadata tags or associations (e.g., action scene, opening credits, closing credits, etc.) In some embodiments, a combination of these approaches can be used for automatic video navigation, such as using a weighted combination based on the context at which replay or skip ahead is selected; using a first approach based on a first context, using a second approach based on a second context, using a third approach based on a third context, etc.; using multiple approaches at once and selecting the approach associated with a highest level of confidence; using multiple approaches at once and selecting a default approach when no single approach meets a threshold level of confidence; using multiple approaches at once and selecting a mean, median, or mode; among other possibilities. Various approaches known to those of ordinary skill in the art for combining data can be utilized within the scope of the various embodiments.

Figure 3:
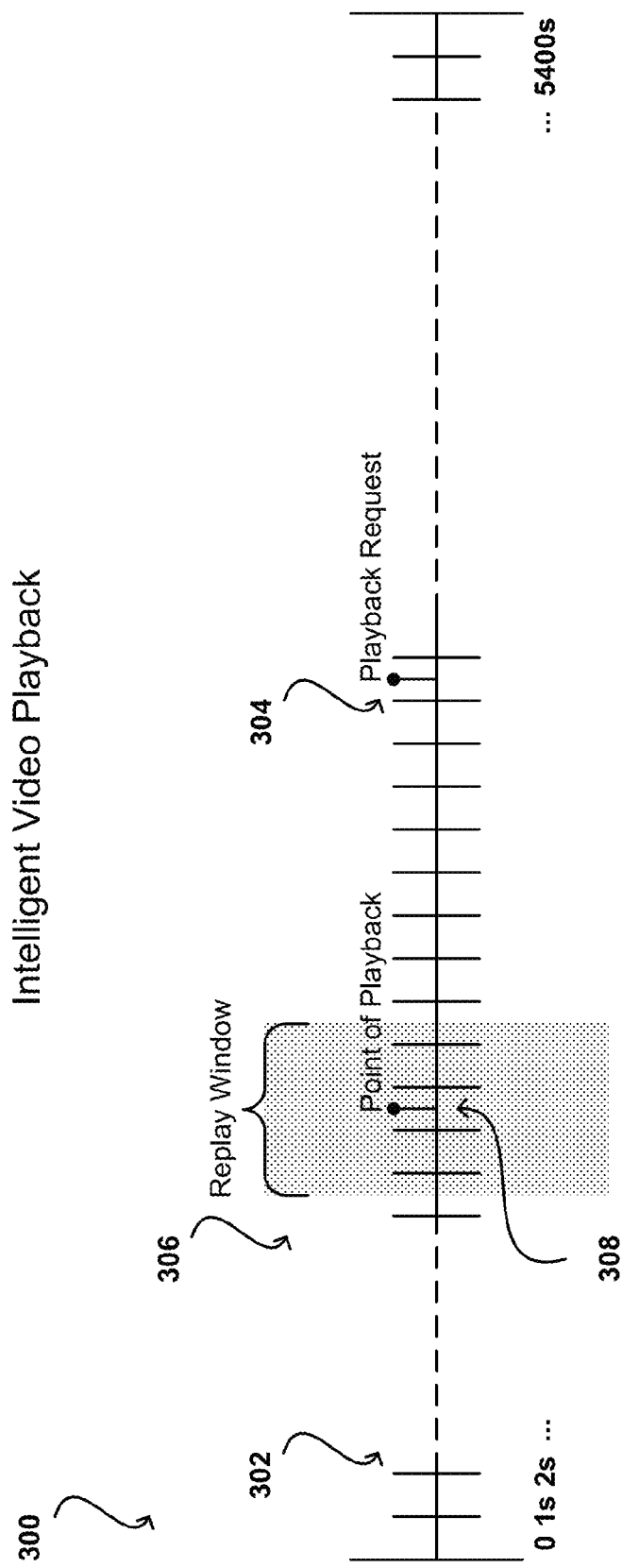
FIG. 3 illustrates an example approach for providing intelligent navigation for a digital video that can be used in accordance with an embodiment.

FIG. 3 illustrates an example approach for providing navigation for a digital video that can be used in accordance with an embodiment. In particular, FIG. 3 depicts an approach for replaying a portion of a digital video utilizing the automatic navigation techniques discussed herein. In the example 300 of FIG. 3, a 90-minute digital video is represented as a timeline 302 in increments of seconds from 0 to 5400 seconds. A user (not shown) views the video up to a point in time 304, which can represent a frame of the digital video (e.g., ¹⁄₂₄ths of a second if the video is shot at 24 frames per second (fps)). At that point in time or frame 304, the user desires to replay a portion of the video and requests playback by clicking an intelligent replay button. In this example, a replay window 306 is identified for determining where in the video to initiate playback. In an embodiment, the replay window comprises a period of time between a minimum replay threshold (e.g., 8 seconds or 192 frames) and a maximum replay threshold (e.g., 12 seconds or 288 frames). In various embodiments, the minimum replay threshold can be as short as 3 seconds and the maximum replay threshold can be as long as 5 minutes. In some such embodiments, holding down a replay button or clicking on the replay button multiple times can cause replay to be initiated from a point further back in time or a point based on coarser segmentation data (e.g., DVD chapter segmentation data). In some embodiments, only one of a minimum replay threshold or a maximum replay threshold can be utilized. In other embodiments, no thresholds are utilized and either all previous played portions of a video are analyzed to determine the point of playback or some other heuristic can be utilized for determining the point of playback (e.g., navigating back to the beginning of a scene or a shot, beginning of dialogue, beginning of a background song or score, etc.)

In this example, after the replay window has been identified, the replay window can be analyzed to determine a point of playback 308 from where replay of the video is initiated. As discussed elsewhere herein, the point of playback can be based on video segmentation data, closed captioning, cumulative data from a community of users, other metadata, or a combination thereof. For example, the point of playback 308 can represent the beginning of a scene or a shot corresponding to point or frame 304, the beginning of dialogue according to closed captioning data, a playback point selected by a community of users, and/or the beginning of a musical score, among other possibilities. In some embodiments, automatic playback can be accompanied with an enhancement between frames 308 and 304, such as the segment of video between points or frames 308 and 304 being played in slow-motion or at a decreased frame rate, closed captioning being added to the segment, extrinsic data being displayed during the segment, zooming in/zooming out to a particular portion of the frames of the segment, among other enhancements. Although example 300 of FIG. 3 illustrates automatic replay, it will be appreciated by one of ordinary skill in the art that similar techniques can be utilized for enabling automatic fast-forwarding.

Figure 4:
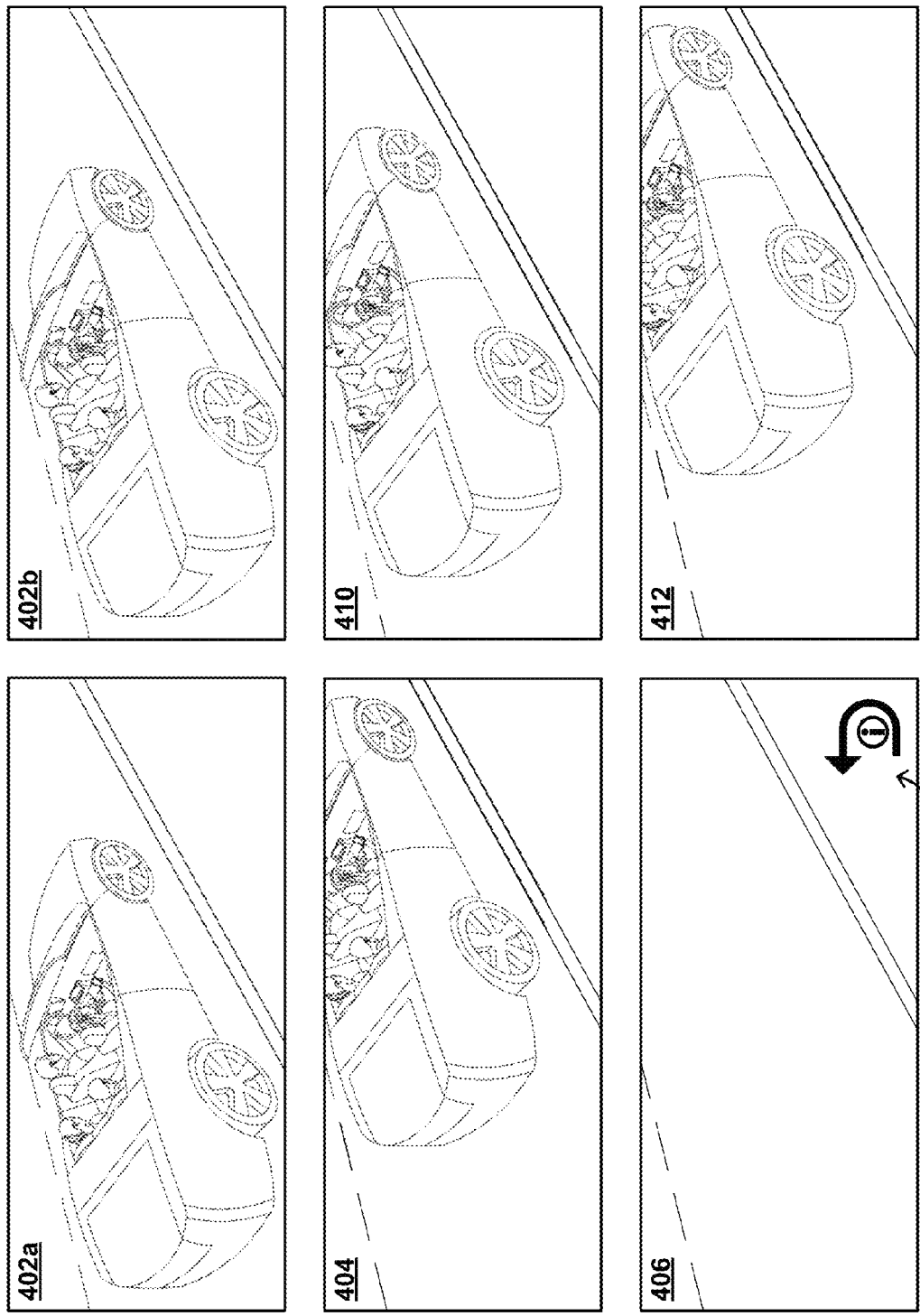
FIG. 4 illustrates an example approach for enhancing a digital video that can be used in accordance with an embodiment.

FIG. 4 illustrates an example approach for enhancing a digital video that can be used in accordance with an embodiment. In the example of FIG. 4, a stationary camera (not shown) is utilized to capture video of a moving car when the car is centered within the field of view of the camera, as seen in frame 402a, as the car moves outside the center of the field of view of the camera, as seen in frame 404, and as the car moves outside the field of view of the camera, as seen in frame 406. It will be appreciated that there additional frames between frames 402a and 404 and 404 and 406 but only frames 402a, 404, and 406 are provided for illustrative purposes. At a point in time corresponding to frame 406, a user (not shown) elects to playback a portion of the video and performs a user interaction to cause user interface element 410, an automatic playback button, to be displayed and to be selectable. For example, the user may tap a touchscreen of a portable computing device displaying the video or use a finger to hover over the touchscreen, use a mouse or other input element to move a virtual cursor over a video application playing the video, or press a remote control button of a television set, digital media player, or other video display appliance, among other possibilities. In this example, the scene or shot corresponding to frames 402a, 404, and 406 has been annotated in metadata as an action scene. Selection of the automatic replay button 408 causes playback to be initiated from the beginning of the shot or scene, as seen in frame 402b. In this example, the selection of the automatic replay button also causes the video segment to be played in slow-motion or at a decreased frame rate because the scene is characterized as an action scene. Thus, instead of viewing the car as it moves from the center of the field of view of the camera until is completely outside the field of view of the camera as seen in frames 402a, 404, and 406, the car can be seen from the center of the field of view of the camera as it slowly goes outside, but not completely outside, the field of view of the camera, as seen in frames 402b, 410, and 412.

In some embodiments, a user selection of intelligent playback automatically causes a portion of a video to be played in slow-motion or at a slower frame rate, such as when a scene or shot is characterized as an action scene or action shot. In other embodiments, users can manually cause a portion of a video to be played in slow-motion or at a slower frame rate, such as holding down the intelligent replay button or tapping the intelligent replay button multiple times. In some embodiments, a portion of a video can be replayed at different, slower frame rates. For example, holding down the intelligent replay button for 1 second will cause a portion of a video to be replayed at 2× the normal frame rate, holding the button down 2 seconds will cause the portion of the video to be replayed at 4× the normal rate, holding down the button 3 seconds will cause the portion of the video to be replayed at 16× the normal frame rate, etc. Further, holding down the intelligent replay button for an extended period of time can cause cycling of the different frame rates and releasing the button will result in playback at the last displayed frame rate. In other embodiments, double tapping can cause the portion of the video to be replayed at 2× the normal frame rate, triple tapping can cause the portion of the video to be replayed at 4× the normal frame rate, etc.

In at least some embodiments, audio data can also be modified to correspond to a decreased frame rate using time compression/expansion or time stretching. As known in the art, time stretching leaves the pitch of a signal intact while changing its speed or tempo. There are two primary time compression/expansion techniques—Phase Vocoder and Pitch Synchronized Overlap-Add (PSOLA). Phase Vocoder uses a Short Time Fourier Transform (STFT) to convert the audio signal to the Fourier representation. As the STFT returns the frequency domain representation of the audio signal at a fixed frequency grid, the actual frequencies of the partial bins can be found by converting the relative phase change between two STFT outputs to actual frequency changes. The timebase of the audio signal can be changed by calculating the frequency changes in the Fourier domain on a different time basis, and then an inverse STFT is computed to regain the time domain representation of the signal. PSOLA is based on a correct estimate of the fundamental frequency of the processed audio signal. In one implementation, the Short Time Average Magnitude Difference function is calculated to find the minimum value. The timebase is changed by copying the input to the output in an overlap-and-add manner while simultaneously incrementing the input pointer by the overlap-size minus a multiple of the fundamental period. This results in the input being traversed at a different speed than the original data while aligning the estimated fundamental period.

Figure 5:
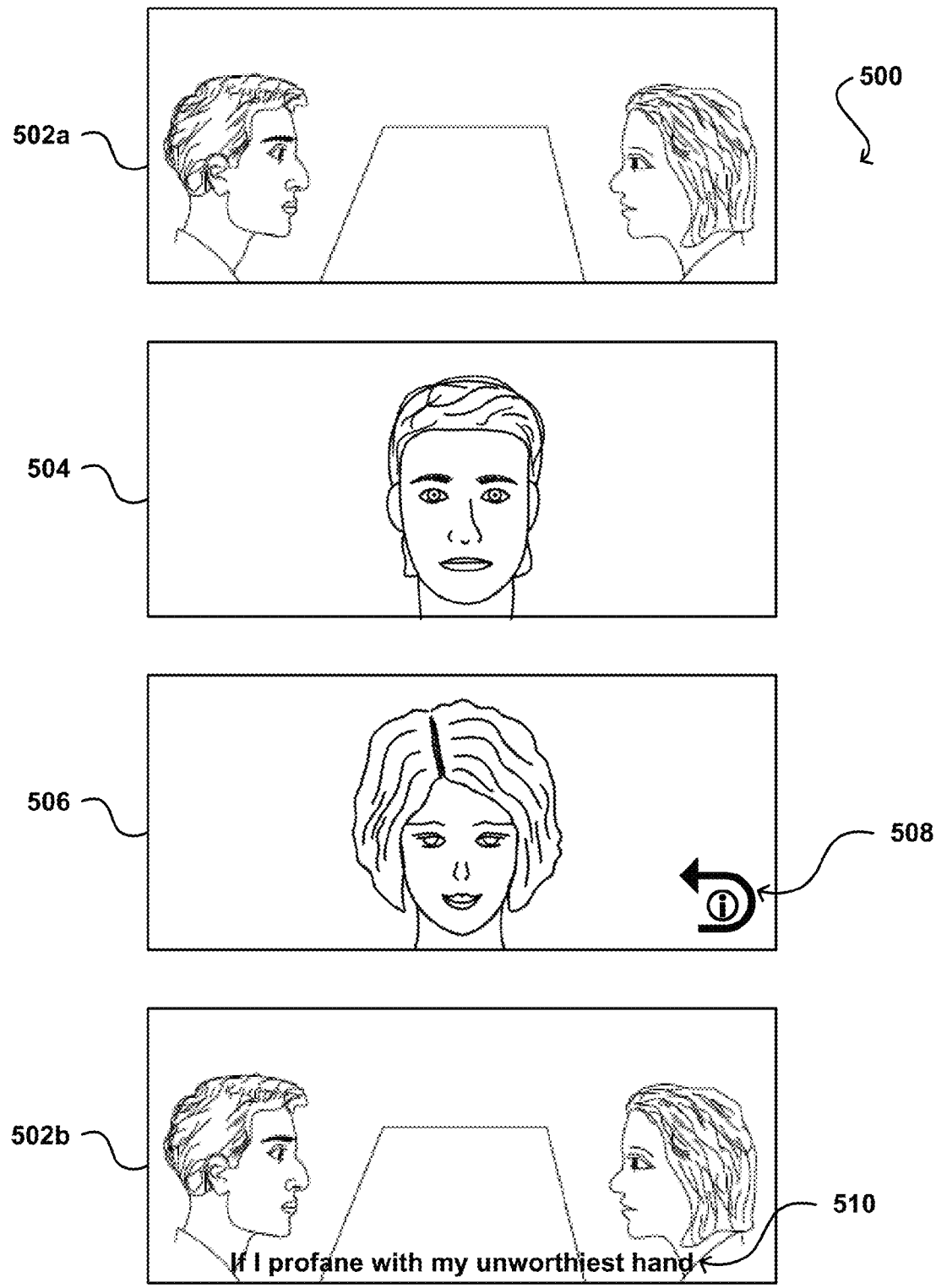
FIG. 5 illustrates an example approach for enhancing a digital video that can be used in accordance with an embodiment.

FIG. 5 illustrates an example approach for enhancing a digital video that can be used in accordance with an embodiment. In particular, the example video segment 500 comprises a couple talking at a restaurant with a first camera capturing a profile view of both the man and the woman, as shown in frame 502a; a second camera capturing a front view of the man as he speaks, as depicted in frame 504; and a third camera capturing a front view of the woman as she speaks, as illustrated in frame 506. Again, it should be understood that there can be additional frames between frames 502a and 504 and 504 and 506. At a particular point in time corresponding to frame 508, a user (not shown) performs an interaction causing a user interface element 508, an intelligent replay button, to be displayed and to be selectable. The user subsequently clicks on the intelligent replay button, causing a portion of the video to be replayed at the beginning of the frame 502b. In this example, video segment or scene 500 includes dialogue. Therefore, upon replay, the scene 500 is augmented with closed captioning 510.

In some embodiments, a user selection of intelligent playback automatically causes a portion of a video to be incorporated with closed captioning, such as when a scene or shot includes dialog. In other embodiments, users can manually cause a portion of a video to be played with closed captioning, such as holding down the intelligent replay button or tapping the intelligent replay button multiple times. In some embodiments, holding down the intelligent replay button or multiple clicks of the intelligent replay button can enable different modalities to be selected by a user. For example, in an embodiment, holding down the replay button can enable a user to select to review a scene in slow motion, review the scene with closed captioning, review the scene with extrinsic data, review a zoomed in/zoomed out perspective of the scene, among other possible enhancements.

Examples of the extrinsic data that can be presented may include names or descriptions of performers in a video, biographies or filmographies of the performers, commentary, trivia, mistakes, user comments, image data, and/or other data. The extrinsic data may include curated data that is professionally managed, verified, or is otherwise trustworthy, and/or non-editorially curated sources (e.g., "Wiki" sources). For example, the extrinsic data may include cast/ crew data, quote/trivia data, soundtrack data, product data, and/or other data. The cast/crew data can include the name, biographical data, character information, images, and/or other data describing cast members who perform in a video or crew members who are involved in the production of the video. The biographical data may include various information such as stage name, birth name, date of birth, date of death, an editorially curated biography, and/or other information.

The quote/trivia data may include various quotations from characters, trivia items, goofs, and other interesting tidbits of information for the video and may be correlated with times of appearance in in the video and/or scenes of appearance in the video. The soundtrack data may include various information about the audio of the video. For example, the soundtrack data may identify that a particular audio track is being used at a certain time in the video or during a certain scene of the video. The soundtrack data may indicate whether the audio corresponds to a title or theme track. In addition, the soundtrack data may identify performers who vocally perform characters in the audio. Such performers may be considered cast members. However, such performers may differ from cast members who visually perform the same characters in some cases. One such case is where, for example, when a song is recorded by a vocalist and a different performer merely lip-syncs to the recorded song in the video.

The product data may identify associations of products with times or scenes in a video. The products may correspond to any item offered for purchase, download, rental, or other form of consumption. For example, a particular brand of potato chips may be shown and/or mentioned in dialogue of a movie. The product data may be used to promote products that are related to various scenes in the video at the appropriate times. Such promotions may be rendered relative to a position of the product within a frame of the video. Such products may also include books, electronic books, soundtrack albums, etc. that are related to the video. For example, the video may be an adaptation of a book, or the album might be for the soundtrack of the video.

The image data may correspond to images of a performer which are taken when the performer is not performing a particular character. For example, such an image might be taken at an awards ceremony, at a press conference, at an informal setting, and/or elsewhere. Such an image may be a headshot or other image. Multiple generic images may be provided for a particular performer. For example, a performer may have a lengthy career, and the performer's image data may be included for various times within the career.

Although the example of FIG. 5 illustrates automatic replay, it will be understood by one of ordinary skill that similar techniques can be implemented for automatic fast-forwarding.

Figure 6:
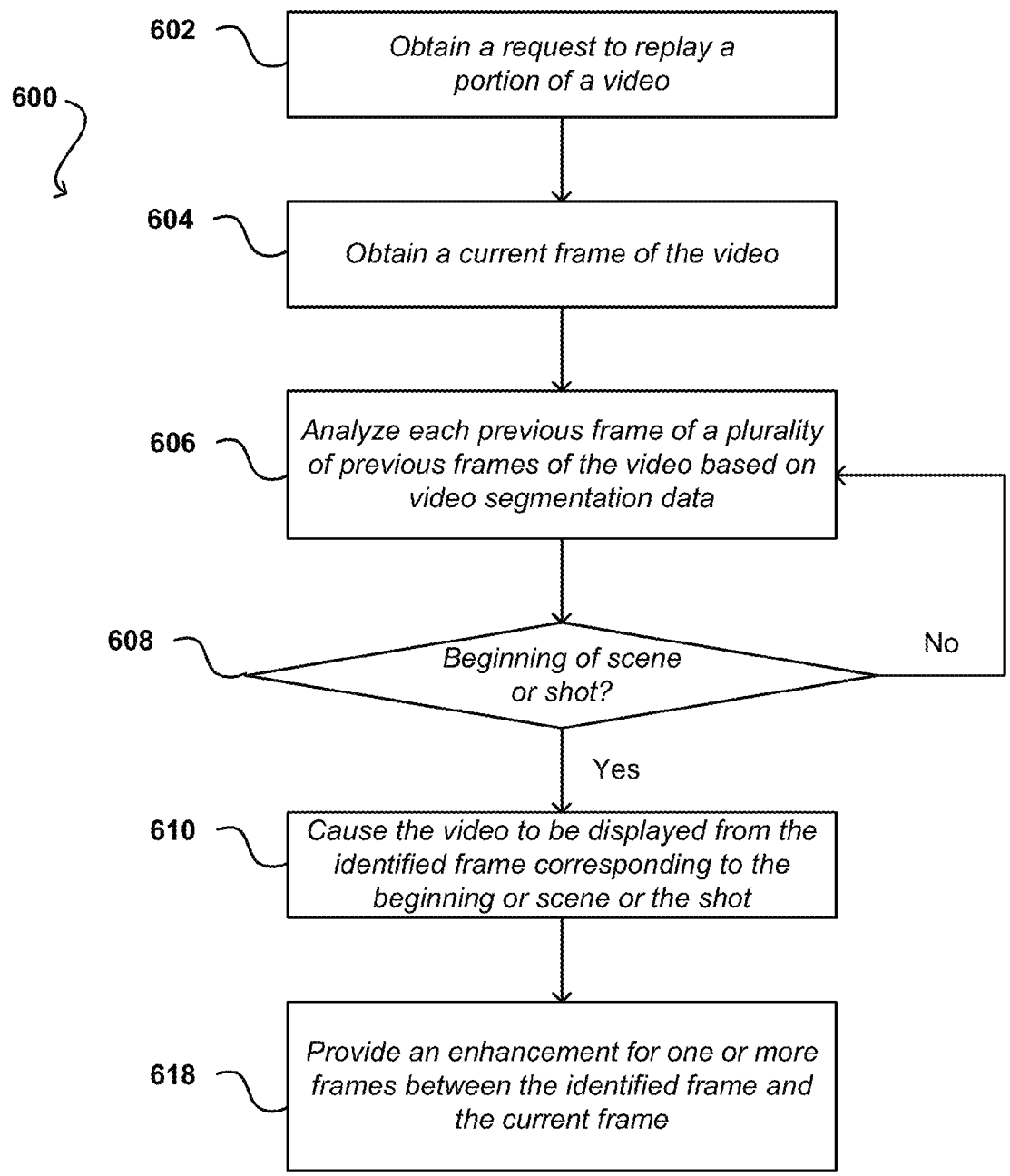
FIG. 6 illustrates an example process for enabling intelligent video navigation that can be used in accordance with an embodiment.

FIG. 6 illustrates an example process 600 for enabling intelligent video navigation that can be used in accordance with an embodiment. It should be understood that, for any process discussed herein, there can be additional, fewer, or alternative steps performed in similar or alternative orders, or in parallel, within the scope of the various embodiments unless otherwise stated. The process may begin by powering on a computing device and playing a video. The process 600 may continue by obtaining a request to replay a portion of the video as the video is being played 602. For example, a user may cause an intelligent replay button to be displayed and to be selectable, such as by tapping on a touchscreen presenting the video or using a finger to hover over the touchscreen; clicking on the video as it is being played using an input element, such as a mouse, trackpad, or pointer stick; or pressing a remote control button as the video is being played. After the intelligent replay button is displayed, the user can select the intelligent replay button, such as by tapping or clicking on the button. A current frame of the video is then obtained 604. Each previous frame of a plurality of previous frames is analyzed based on video segmentation data 606 to determine an identified frame from which to initiate playback. In some embodiments, the plurality of previous frames to be analyzed can be determined by setting a minimum replay threshold and a maximum replay threshold such that only those frames within this replay window are analyzed. In an embodiment, the minimum replay threshold can be set to 8 seconds and the maximum replay threshold can be set to 12 seconds. In other embodiments, the minimum replay threshold can be set as low as 3 seconds and the maximum replay threshold can be set as high as 5 minutes. In some such embodiments, holding down the replay button or clicking on the replay button multiple times may result in replay from a point further back in time or a point based on coarser segmentation data, such as DVD chapter data. In still other embodiments, only one of a minimum replay threshold or a maximum replay threshold can be set. For instance, in one embodiment, when a current frame corresponds to an action scene, a maximum threshold of fifteen minutes can be set and all of the frames between the current frame and the 21,600 previous frames can be analyzed to determine a beginning of scene or a shot corresponding to the current frame.

At a decision point 608, it is determined whether one of the previous frames marks the beginning of a scene or a shot. If a previous frame does not mark the beginning of a scene or a shot, a next frame is analyzed. If a previous frame is determined to mark the start of a scene or a shot, that identified frame is selected as the playback point, and playback can be initiated from that frame 610. During playback, the segment between the identified frame and the current frame can be enhanced 612. For example, if the scene includes dialogue, playback can be enhanced with closed captioning. As another example, if the scene corresponds to an action scene, the scene can be played back in slow motion or at a decreased frame rate. In at least some embodiments, the audio data, including speech, can be time-stretched and aligned with the corresponding video data as discussed elsewhere herein. In some embodiments, the enhancement may be the display of extrinsic data, such as cast and character images and information, biographical information, quotations, trivia, goofs, related offerings, scene information, and other extrinsic data.

Although the example process 600 is directed towards intelligent replay, it will be appreciated by one of ordinary skill in the art that similar techniques can be utilized for intelligent fast-forwarding. For example, instead of analyzing a set of previous frames for determining the beginning of a scene or a shot, intelligent fast-forwarding can be implemented by analyzing a set of successive frames for determining the end of a scene or a shot. In at least some embodiments, intelligent fast-forwarding can also include time-compression of audio data and alignment with corresponding video data as discussed elsewhere herein.

Figure 7:
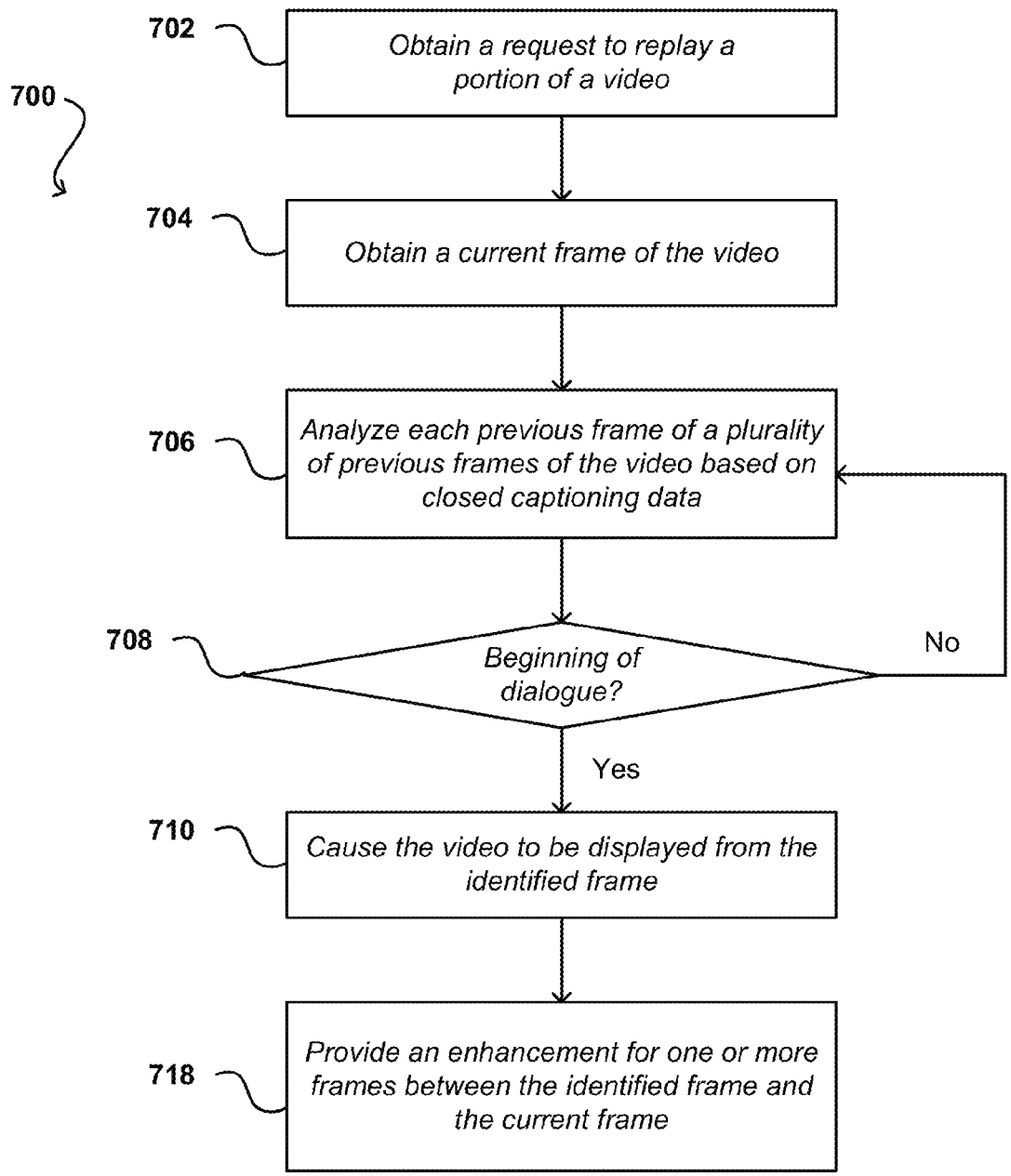
FIG. 7 illustrates an example process for enabling intelligent video navigation that can be used in accordance with an embodiment.

FIG. 7 illustrates an example process 700 for enabling intelligent video navigation that can be used in accordance with an embodiment. The process may begin by playing a video on a computing device. The process 700 may continue by receiving a request to playback a portion of the video while the video is being played 702. A current frame, at the point that the playback request is made, is obtained 704. Subsequently, each previous frame of a previous set of frames is analyzed based on closed captioning data 706 to determine a playback point. In particular, the previous set of frames is analyzed to determine whether a previous frame marks the beginning of dialogue 708. As in the example process 600 of FIG. 6, the previous set of frames analyzed can be based on a minimum replay threshold and/or a maximum replay threshold to reduce the amount of processing required of process 700. If a previous frame is determined not to mark the beginning of dialogue, a next frame is analyzed. On the other hand, if a previous frame is determined to mark the beginning of dialogue, that identified frame is selected as the point of playback. The video is then replayed from the identified frame 710. During playback, the portion of video between the identified frame and the current frame can be enhanced 712, such as incorporating closed captioning, playing the segment at a decreased frame rate, or displaying extrinsic data, as discussed elsewhere herein. Although the example process 700 is directed towards intelligent replay, it will be understood by one of ordinary skill that a similar approach can be utilized for intelligent fast-forwarding. For instance, instead of analyzing a set of previous frames for determining the beginning of dialogue, intelligent fast-forwarding can be implemented by analyzing a set of successive frames for determining the end of dialogue.

As mentioned, some embodiments enable different functionality based on user interaction with the intelligent replay or fast-forward button. For example, holding down the intelligent replay button can bring up a menu enabling a user to select closed captioning enhancement or slow motion enhancement. As another example, tapping once on the intelligent replay button can cause a segment of video to be replayed at 2× the normal frame rate, tapping twice will cause the segment to be replayed at 4× the normal frame rate, tapping three times will cause the segment to be replayed at 8× the normal frame rate, etc.

The processes 600 of FIG. 6 and 700 of FIG. 7 are directed towards streaming video, and the intelligent replay functionality is provided as part of a streaming service. Other embodiments are directed towards digital video stored on a computing device, and the intelligent replay functionality is provided as part of a digital video playing application. In some embodiments, the digital video playing application may connect to a remote server to obtain data to provide intelligent video navigation functionality, such as video segmentation data or aggregate video navigation data from a community of users. In other embodiments, video segmentation data, aggregate video navigation data, and the like can be encoded in a stored digital video or stored as separate file but associated with the digital video, and the digital video playing application does not require network connectivity.

Figure 8:
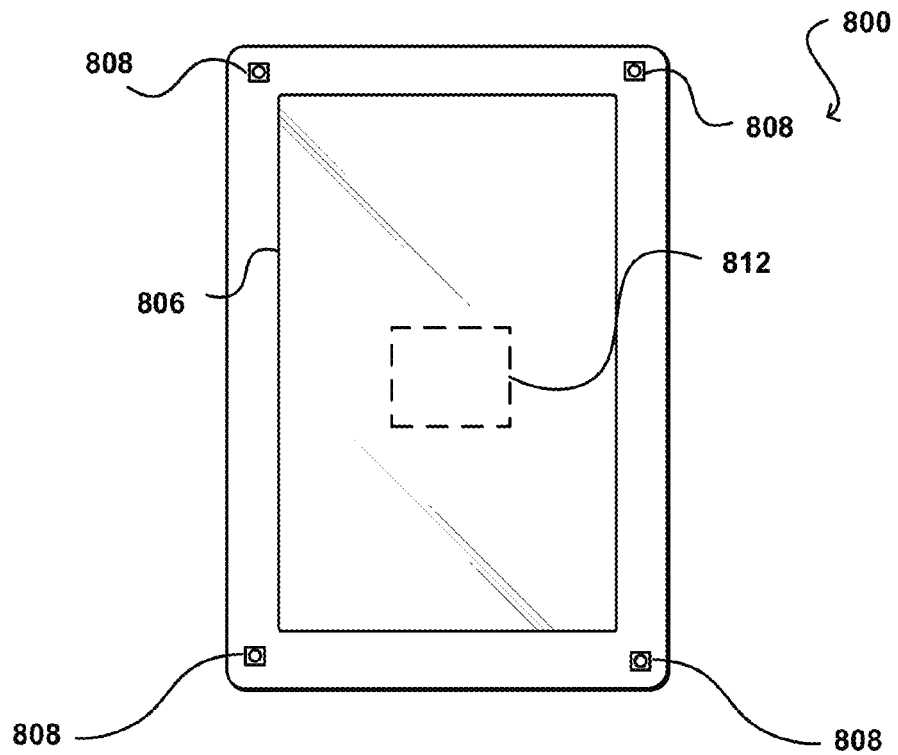
FIG. 8 illustrates an example computing device that can be used in accordance with various embodiments.

FIG. 8 illustrates an example computing device 800 that can be used to perform approaches described in accordance with various embodiments. In this example, the device includes four cameras 808 located at the top and bottom on each of a same and opposite side of the device as a display element 806, and enabling the device to capture images in accordance with various embodiments. The computing device also includes an inertial measurement unit (IMU) 812, comprising a three-axis gyroscope, three-axis accelerometer, and magnetometer that can be used to detect the motion and/or orientation of the device.

Figure 9:
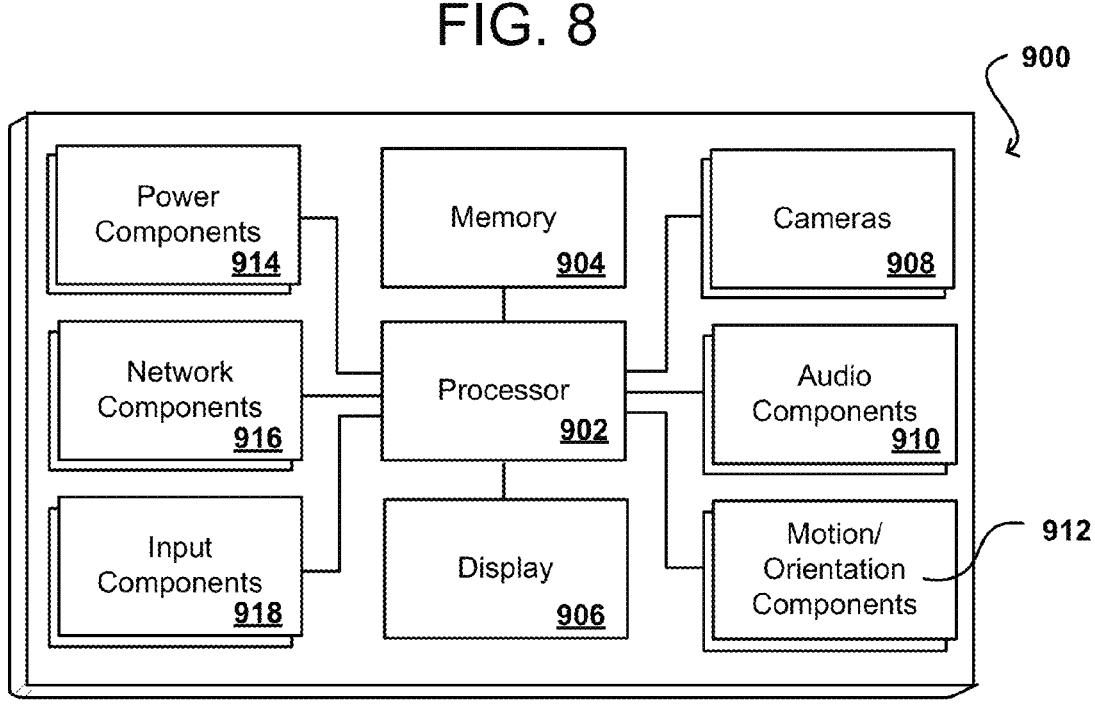
FIG. 9 illustrates an example configuration of components of a computing device such as that illustrated in FIG. 8.

FIG. 9 illustrates a logical arrangement of a set of general components of an example computing device 800. In this example, the device includes a processor 902 for executing instructions that can be stored in a memory component 904. As would be apparent to one of ordinary skill in the art, the memory component can include many types of memory, data storage, or non-transitory computer-readable storage media, such as a first data storage for program instructions for execution by the processor 902, a separate storage for images or data, a removable memory for sharing information with other devices, etc. The device typically will include some type of display element 906, such as a touchscreen, electronic ink (e-ink), organic light emitting diode (OLED), liquid crystal display (LCD), etc., although devices such as portable media players might convey information via other means, such as through audio speakers. In at least some embodiments, the display screen provides for touch or swipe-based input using, for example, capacitive or resistive touch technology. The device in many embodiments will include one or more cameras or image sensors 908 for capturing image or video content. A camera can include, or be based at least in part upon any appropriate technology, such as a CCD or CMOS image sensor having a sufficient resolution, focal range, viewable area, to capture an image of the user when the user is operating the device. An image sensor can include a camera or infrared sensor that is able to image projected images or other objects in the vicinity of the device. Methods for capturing images or video using a camera with a computing device are well known in the art and will not be discussed herein in detail. It should be understood that image capture can be performed using a single image, multiple images, periodic imaging, continuous image capturing, image streaming, etc.

The device, in many embodiments, will include at least one audio element 910, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one or more motion and/or orientation elements 912 that provide information such as a position, direction, motion, or orientation of the device. These one or more motion and/or orientation determining elements 912 can include, for example, accelerometers, inertial sensors, electronic gyroscopes, electronic compasses, and GPS elements.

The computing device also includes various power components 914 known in the art for providing power to a computing device, which can include capacitive charging elements for use with a power pad or similar device. The computing device can include one or more communication elements or networking sub-systems 916, such as a Wi-Fi, Bluetooth, RF, wired, or wireless communication system. The device in many embodiments can communicate with a network, such as the Internet, and may be able to communicate with other such devices. In some embodiments the device can include at least one additional input element 918 able to receive conventional input from a user. This conventional input can include, for example, a push button, touch pad, touchscreen, wheel, joystick, keyboard, mouse, keypad, or any other such component or element whereby a user can input a command to the device. In some embodiments, however, such a device might not include any buttons at all, and might be controlled only through a combination of visual and audio commands, such that a user can control the device without having to be in contact with the device.

Figure 10:
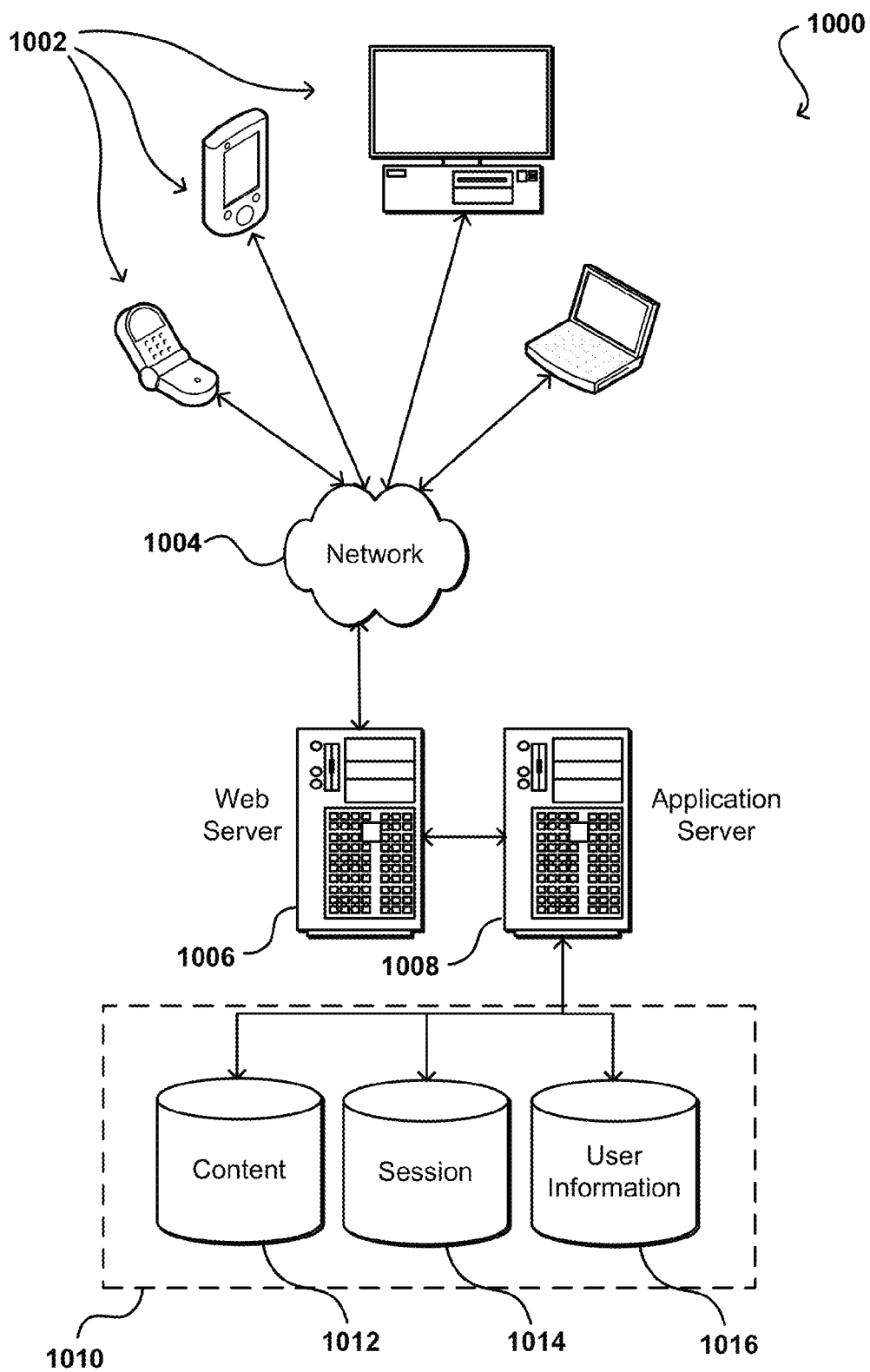
FIG. 10 illustrates an environment in which various embodiments can be implemented.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   a processor; and
   memory including instructions that, upon being executed by the processor, cause the system to:
   obtain a request to replay a portion of a digital video file as the digital video file is being presented;
   obtain a current frame of the digital video file;
   analyze a plurality of previous frames of the digital video file between a minimum point in time and a maximum point in time relative to the current frame to determine that an identified frame of the plurality of previous frames corresponding to the plurality of previous frames and the current frame corresponds to a beginning of dialogue associated with the current frame;
   cause the digital video file to be presented from the identified frame; and
   provide at least one digital video enhancement to one or more frames between the identified frame and the current frame.

2. The system of claim 1, wherein the at least one digital video enhancement includes closed captioning, and the instructions upon being executed further cause the computing device to:
   cause the closed captioning to be presented between the identified frame and the current frame; and
   disable the closed captioning after the current frame.

3. The system of claim 2, wherein the at least one enhancement includes decreasing a first frame rate of the digital video file, and the instructions upon being executed to cause the digital video file to be presented from the identified frame include causing the system to:
   cause the one or more frames between the identified frame and the current frame to be presented at a decreased frame rate; and
   cause the current frame and one or more successive frames of the digital video file to be presented at the first frame rate.

4. The system of claim 1, wherein the instructions upon being executed further cause the computing device to:
   obtain a second request to forward to a second portion of the digital video file;
   obtain a second current frame of the digital video file;
   analyze a plurality of successive frames of the digital video file relative to the second current frame to determine that a second identified frame of the plurality of successive frames corresponds to an end of the dialogue associated with the current frame; and
   cause the digital video file to be presented from the second identified frame.

5. A computer-implemented method, comprising:
   obtaining a request to replay a portion of a video;
   obtaining a current frame of the video;

determining an identified frame of a plurality of previous frames of the video from which to initiate replay based at least in part upon closed captioning; and causing the video to be displayed from the identified frame.

6. The computer-implemented method of claim 5, wherein the closed captioning data indicates a beginning of dialogue associated with the current frame.

7. The computer-implemented method of claim 5, wherein the plurality of previous frames comprises frames between a minimum point in time and a maximum point in time relative to the current frame.

8. The computer-implemented method of claim 5, further comprising:

causing closed captioning to be displayed between the identified frame and the current frame; and disabling the closed captioning after the current frame.

9. The computer-implemented method of claim 5, wherein the video corresponds to a first frame rate, and causing the video to be played from the identified frame includes:

causing one or more frames between the identified frame and the current frame to be displayed at a decreased frame rate; and causing the current frame and one or more successive frames to be displayed at the first frame rate.

10. The computer-implemented method of claim 9, further comprising:

generating time-stretched audio data corresponding to the one or more frames between the identified frame and the current frame.

11. The computer-implemented method of claim 5, wherein the current frame corresponds to a first zoom level, and causing the video to be played from the identified frame includes:

causing one or more frames between the identified frame and the current frame to be displayed at a modified zoom level; and causing the current frame and one or more successive frames of the video to be displayed at the first zoom level.

12. The computer-implemented method of claim 5, wherein determining the identified frame is further based at least in part upon aggregate video navigation data from a community of users.

13. The computer-implemented method of claim 5, wherein determining the identified frame is further based at least in part upon video segmentation data.

14. The computer-implemented method of claim 5, wherein determining the identified frame is further based at least in part upon one of a musical score, a song, or other audio data corresponding to the current frame.

15. The computer-implemented method of claim 5, further comprising:

obtaining a second request to forward to a second portion of the video;

obtain a second current frame of the video;

analyze a plurality of successive frames of the video relative to the second current frame to determine that a second identified frame of the plurality of successive frames corresponds to an end of dialogue associated with the current frame; and cause the video to be presented from the second identified frame.

16. A non-transitory computer-readable storage medium storing instructions that, upon being executed by a processor of a computing device, cause the computing device to:

obtain a request to replay a portion of a video;

obtain a current frame of the video;

determine an identified frame of a plurality of previous frames of the video from which to initiate replay based at least in part upon closed captioning corresponding to the plurality of previous frames and the current frame; and cause the video to be displayed from the identified frame.

17. The non-transitory computer-readable storage medium of claim 16, wherein the video is a streamed video.

18. The non-transitory computer-readable storage medium of claim 16, wherein the video is stored in non-transitory memory of the computing device.

19. The non-transitory computer-readable storage medium of claim 16, wherein the instructions upon being executed further cause the computing device to:

cause closed captioning to be displayed between the identified frame and the current frame; and disable the closed captioning after the current frame.

20. The non-transitory computer-readable storage medium of claim 16, wherein the video corresponds to a first frame rate, and the instructions that cause the video to be played from the identified frame includes causing the computing device to:

cause one or more frames between the identified frame and the current frame to be displayed at a decreased frame rate; and cause the current frame and one or more successive frames to be displayed at the first frame rate.

* * * * *